United States Patent [19]

Eggers et al.

[11] 4,154,162

[45] May 15, 1979

[54] LOWER FORMING APRON AND DRIVE FOR A CROP MATERIAL ROLL FORMING MACHINE

[75] Inventors: Edward T. Eggers, New Holland; Allison W. Blanshine, Lititz, both of Pa.

[73] Assignee: Sperry Rand Corporation, New Holland, Pa.

[21] Appl. No.: 718,706

[22] Filed: Aug. 30, 1976

[51] Int. Cl.² .................. B30B 5/06; B30B 9/00; A01D 39/00
[52] U.S. Cl. .................................. 100/88; 56/341; 198/814
[58] Field of Search .................. 100/88, 5, 7; 56/341–360; 198/814, 816

[56] References Cited

U.S. PATENT DOCUMENTS

| 452,191 | 5/1891 | Oliver | 198/814 |
|---|---|---|---|
| 1,188,725 | 6/1916 | Brown | 198/814 X |
| 1,473,614 | 11/1923 | Fersdahl | 56/360 |
| 2,759,594 | 8/1956 | Kleboe et al. | 198/814 |
| 3,463,024 | 8/1969 | Blanshine et al. | 74/242.11 |
| 3,847,073 | 11/1974 | Mast et al. | 100/88 |
| 3,964,246 | 6/1976 | Kopaska | 100/88 |

*Primary Examiner*—Peter Feldman

*Attorney, Agent, or Firm*—John B. Mitchell; Ralph D'Alessandro; Frank A. Seemar

[57] ABSTRACT

A crop material roll forming machine, such as a large round baler, has a mobile frame adapted to travel across a field, an upper apron movably mounted on the frame that cooperates with an improved lower apron in defining a roll forming region therebetween. The lower apron is movably mounted on the frame below the upper apron and includes a series of fore-and-aft extending transversely spaced apart flexible members which are supported at their respective forward end portions by a first series of transversely spaced apart elements and at their respective rearward end portions by a second series of transversely spaced apart elements. The first series of elements are individually mounted on the front end of the frame and are yieldably movable in a fore-and-aft direction for maintaining a level of tension on the flexible members sufficient to facilitate coiling of crop material into a roll in the roll forming region. The second series of elements are supported on a transverse shaft rotatably mounted on the rear end of the frame and adapted to be drivingly connected to a drive means which drives the upper apron in a predetermined direction and the lower apron in a direction counter to the predetermined direction of the upper apron.

4 Claims, 3 Drawing Figures

LOWER FORMING APRON AND DRIVE FOR A CROP MATERIAL ROLL FORMING MACHINE

BACKGROUND OF THE INVENTION

1. FIELD OF THE INVENTION

The present invention generally relates to a machine for forming a roll of crop material, such as hay or the like, and, more particularly, is directed to an improved lower forming apron and the manner in which it is driven.

2. DESCRIPTION OF THE PRIOR ART

The present invention provides a lower forming apron and drive for facilitating formation of a crop material roll at a roll forming region of a machine, such as a large round baler, which constitutes an improvement over that disclosed and illustrated in U.S. Pat. No. 3,847,073, issued Nov. 12, 1974 to Aquila D. Mast et al and assigned to the same assignee as the present invention.

The prior art lower forming apron disclosed in the aforesaid patent includes a series of transversely spaced apart endless flexible chains that are entrained around a series of transversely spaced apart front drive sprockets and a rotatably mounted rear transverse tube provided with a corresponding series of guide members fixed on the tube for rotation therewith. The front drive sprockets are carried by a transversely extending drive shaft mounted for rotation between the opposite sidewalls of the machine. A drive sprocket is mounted on the end of the front drive shaft for connection through suitable drive components to the power takeoff of a tractor which tows the machine. The rear transverse chain guide tube is mounted for movement in a fore-and-aft direction to preset a level of tension sufficient to drive the upper working course of the lower apron chains in a rearward direction upon predetermined rotation of the front drive sprockets through the rotary motion transmitted thereto by the power takeoff of the tractor.

As an alternative to or variation of the rear transverse guide tube, individually mounted idler sprockets have been provided for supporting the respective rearward end portions of the lower apron chains. Each of the rear idler sprockets are movable in a fore-and-aft direction to preset the chain tension.

During operation, a large portion or length of the chains are under tension. Such tensioning is required due to the pushing action of the front drive sprockets in moving the chains rearwardly over the rear guide tube. As the roll within the roll forming region grows in diameter and weight, the tension on the chains increase, resulting in an increase in wear to the chains, as well as, to the drive sprockets and the rear guide tube. Furthermore, the increased tension or tautness of the chains requires an increase in horsepower to drive the apron. Still further, upon wear of the chains, they become slack and thus require an adjustment of the rear guide tube.

SUMMARY OF THE INVENTION

The improved mounting and drive for the lower apron as provided for by the present invention obviates the aforementioned problems associated with the lower apron disclosed in aforesaid U.S. Pat. No. 3,847,073. The improved mounting of the lower apron enables the apron to be driven from its rear end thereby decreasing the length of the chains that are under tension, thus resulting in less wear to the chains, as well as, the operational components associated therewith. Furthermore, the tension on the chains are automatically adjusted during the roll forming operation and as the chains become slack from normal wear, resulting in prolonging the useful life of the chains and a decrease in amount of horsepower required to drive the machine.

Accordingly, the present invention sets forth in a roll forming machine having a frame adapted to travel across a field, an upper apron and a lower apron defining therebetween a roll forming region for coiling crop material into a roll and drive means for driving the upper and lower aprons, an improved arrangement for mounting the lower apron such that it can be driven from the rear end thereof which reduces its wear and prolongs the useful life thereof.

More particularly, the lower apron includes a series of fore-and-aft extending, transversely spaced apart flexible members supported at their respective forward end portions by a first series of transversely spaced apart elements and at their respective rearward end portions by a second series of transversely spaced elements. The first series of elements are individually mounted on the front end of the frame and are yieldably movable in a fore-and-aft direction. The second series of elements are mounted on a common drive shaft which is rotatably mounted at the rear end of the frame and is adapted to be connected to the drive means for predetermined rotation of the drive shaft and the second series of elements therewith for movement of the working portions of the flexible members in a rearward direction. The yieldable movement of the first series of elements provides for automatic tensioning of the flexible members sufficient to facilitate the crop coiling process during the roll forming operation.

Other advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc. are words of convenience and are not to be construed as limiting terms.

IN GENERAL

Figure 1:
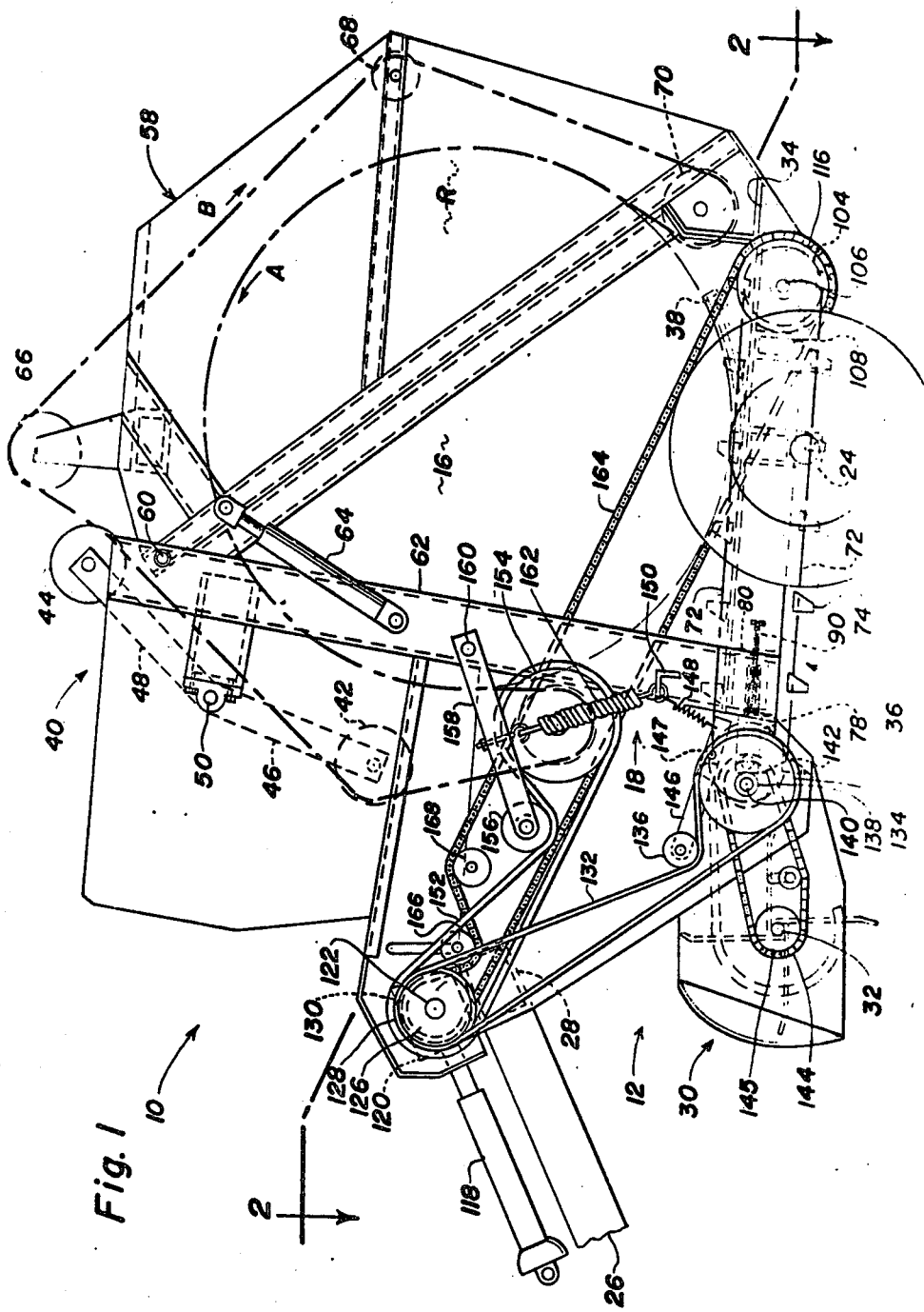
FIG. 1 is a left side elevational view of a crop material roll forming machine embodying the principles of the present invention.

Referring to the drawings, and particularly to FIG. 1, there is shown a crop material roll forming machine, generally indicated by numeral 10, being provided with a base frame, generally designated 12, having right and left sides 14,16 respectively (only the left side being seen in FIG. 1) between which extends a roll forming region, being generally designated by the numeral 18 and within which a completed roll R is illustrated. The frame 12 is supported and made mobile by right and left ground-engaging wheels 20,22 (only the left wheel 22 being shown in FIG. 1) respectively rotatably mounted on opposite ends of an axle 24, being connected to and extending transversely across the base frame 12 and projecting outwardly from the opposite sides 14,16 of the machine 10.

The machine 10 is adapted to be connected to a tractor (not shown) for towing the machine forwardly across a field in field operation and for road transport by means of a tongue 26 which is connected at its rear end to and extends forwardly from a horizontal beam 28 of the frame 12 which extends between and interconnects with the sides of the frame 12.

Extending forwardly from the front lower portion of the mobile frame 12 of the macine 10 is a pickup unit 30 which conventionally includes a drum having a series of transversely spaced circular slots therein through which a series of spring fingers extend for purposes of picking up a swath or windrow of crop material. The spring fingers are driven by a shaft 32, in a clockwise direction as viewed in FIG. 1, by means to be described, for the purposes of elevating and rearwardly feeding a swath or windrow of crop material, such as hay or the like, into the roll forming region 18 of the machine 10. The material fed by the pickup unit 30 is passed rearwardly to the front end of a floor 34 and a forward portion of a lower apron, generally designated by the numeral 36. The lower apron 36 incorporates the improvement provided by the present invention and will be described in detail later on. The floor 34 is supported by and extends between the sides 14 and 16 of frame 12. The rearmost end of floor 34 contains a series of arcuate-shaped springs 38 that are mounted to the floor 34 and extend up and away therefrom. The springs 38 act as a continuation of the floor 34 and direct the material, which is conveyed rearwardly thereacross by the upper course of the lower apron 36, upwardly into engagement with the lower course of an upper apron assembly, designated generally by 40.

The lower course of upper apron assembly 40, in combination with the upper course of the lower apron 36, directs the crop material upwardly and forwardly to effect a rolling of the crop material into roll R in the direction of the arrow A of FIG. 1. During roll forming, as the upper and lower courses of the upper apron 40 move respectively in the directions of the arrows A and B in FIG. 1, it will be understood that the lower course of the upper apron 40 is capable of expanding as the roll R expands in diameter. This is allowed by idler sprockets 42,44 which movably support portions of the upper course of apron 40. The idler sprockets 42,44 are mounted upon arms 46,48 which are disposed adjacent each side of the frame 12 and are supported on a transverse shaft 50, rotatably mounted between the upper portions of sides 14,16. The arms 46,48 are biased by extension springs (not shown) mounted along the frame sides which normally position the lower course of the upper apron 40 in a contracted condition adjacent the upper course of the lower apron 36, but are yieldable for allowing the aforementioned expansion during roll formation.

Figure 2:
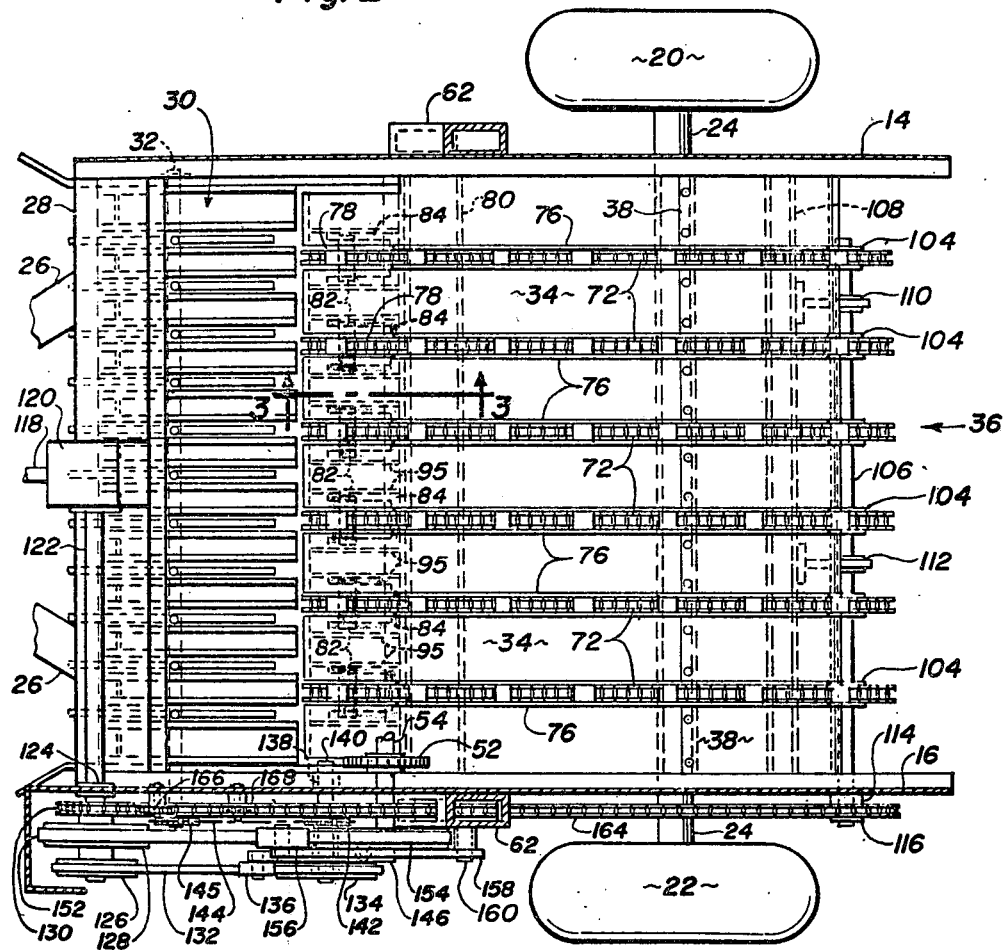
FIG. 2 is a plan view of the lower apron of the machine of FIG. 1, showing the mounting and drive therefor in accordance with the principles of the invention.

The upper apron 40 also extends about front drive sprockets 52 mounted on a transverse shaft 54 (only one of the sprockets 52 and shaft 54 are partially shown in FIG. 2) rotatably supported between the front portion of sides 14,16 of frame 12.

The base frame 12 also includes a rear upper frame or tailgate assembly 58 which transversely extends between sides 14,16 and is pivotally connected at 60 to the upper portions of upright frame members 62 of frame 12. The tailgate assembly 58 is pivotally moved counterclockwise from its lower roll forming position, as shown in FIG. 1, to an upper discharge position (not shown) by a pair of hydraulic cylinders 64 (only the left one being shown) respectively mounted on the upright members 62 and extending along the opposite sides of the frame 12. The tailgate 58 also rotatably mounts upper, rear and lower idler sprockets 66,68 and 70 respectively, about which the upper apron 40 also extends.

IMPROVED MOUNTING OF LOWER APRON

Now, in reference to FIG. 1, and particularly to FIG. 2, the lower apron 36 and its improved mounting will be discussed in detail. The lower apron 36, as conventionally provided heretofore, includes a series of fore-and-aft extending transversely spaced apart flexible members in the form of a series of endless flexible link-type chains 72, some of whose links are provided with aggressive type lugs 74. The upper courses of the chains 72 are aligned to move within fore-and-aft extending corresponding spaced apart guide channels 76 mounted on the upper surface of the floor 34.

Figure 3:
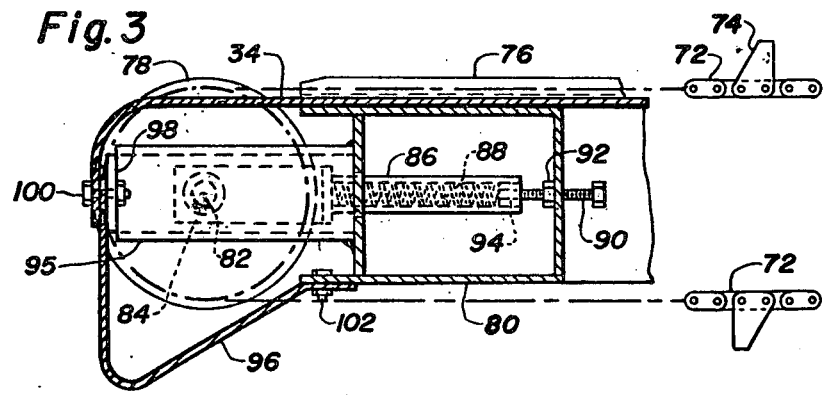
FIG. 3 is an enlarged side elevational view of one of the front yieldably movably mounted drive sprockets.

According to the principles of the present invention, the chains 72 are supported at their respective forward end portions by a series of transversely spaced apart idler sprockets 78. The idler sprockets 78 are mounted for rotation and for yieldable movement, in a fore-and-aft direction, on a transverse box-shaped frame member 80 that extends across the forward end of the frame 12 between the opposite sidewalls 14,16. As best seen in FIG. 3, each of the sprockets 78 are journalled for rotation on a shaft 82 that is supported by the legs of a bifurcated bracket 84 that includes an elongated tube member 86. The tube 86 houses a coil spring 88 and extends within the cavity of member 80 through a passage hole provided in the front face of the member. The free end of the tube 86 is supported by an adjustment bolt 90 that is threaded through a nut 92, which is secured to the inner side of the rear face of member 80 and aligned with the passage hole in the front face. The adjustment bolt 90 extends within the free end of the tube 86 and abuts a spacer 94, housed within the tube and adjacent the end of the coil spring 88. As can be readily understood from the above described mounting arrangement, the sprocket 78 rotates about shaft 82 and is yieldably movable in a fore-and-aft direction. The compression of the coil spring 88 by adjusting bolt 90 controls the amount of force the sprocket 78 will exert on or against the forward end portion of apron chain 72.

The front portion of the floor 34 is provided with a series of slots which are transversely spaced apart in correspondence with the spaced apart relationship of the idler sprockets 78 for permitting the idler sprockets 78 and chains 72 to project therethrough. Further, this front portion of the floor 34 bends downwardly from its generally horizontal main surface. A pair of channel members 95 are disposed on opposite sides of each of the idler sprockets 78 and are secured to and project forwardly from the box-shaped frame member 80 for supporting the terminal end of the front floor portion. Still further, chain guards 96 are provided to shield the lower sides of the sprockets 78 and the respective chains 72. Each channel member 95 includes an out-turned tab 98 to which the front floor portion and a respective one of the guards 96, at its forward end, are attached by bolt 100. Each guard 96, at its other end, is attached to the box-shaped member 80 by a bolt 102.

Also, according to the principles of the present invention, the chains 72 are supported at their respective rearward end portions by a series of transversely spaced apart drive sprockets 104 carried on transverse drive shaft 106 (see FIG. 2). The transverse drive shaft 106 projects through the left sidewall 16 of frame 12 and transversely extends along a rear transverse frame member 108 which is supported between the opposite sidewalls 14, 16 of frame 12. The drive shaft 106 is journalled for rotation within two bearings 110, 112, each supported on the rear transverse frame member 108 and a third bearing 114 supported on the left sidewall 16 of frame 12. The left end of the drive shaft 106 supports a sprocket 116 to be connected to the drive means, shortly to be discussed, for clockwise rotation (as viewed in FIG. 1) of the drive shaft 106 and drive sprockets 104 therewith such that the upper working portion of the chains 72 move in a rearward direction.

As can be readily understood from the above-described mounting of the lower apron 36, the apron chains 72 are supported by the front idler sprockets 78 and the rear drive sprockets 104. Rotation of the drive shaft 106 in a clockwise direction, as viewed in FIG. 1, causes the upper working portion of the chains 72 to move in a rearward direction. The yieldably movable front idler sprockets 78 automatically maintains a level of tension on the chains 72 sufficient for driving of the chains 72 by the rear drive sprockets 104 during the roll forming operation. As the roll R increases in weight and size, during the roll forming process, the idler sprockets 78 move rearwardly to offset any increase of tension in the chains 72 as a result of the increase in the weight of the roll R. This controlling of the tension in the chain 72 has the advantages of prolonging the useful life of the chains 72 and the drive components associated therewith, as well as, reducing the amount of horsepower required to drive the lower apron 36. Furthermore, the spring loaded idler sprockets 78 compensates for any chain tensioning caused by the eccentricity of the drive sprockets 104 due to manufacturing tolerances.

DRIVE MEANS

Now, in reference to FIGS. 1 and 2, the means for driving the operational components of machine 10 will be discussed. The rotary power for driving the pickup 30, the upper apron 40 and the lower apron 36 is derived from the power takeoff (PTO) of a tractor or the like which tows the machine 10 across the fields. A telescoping input shaft 118 transmits the rotary power of the tractor PTO to a gearbox 120, centrally mounted on the horizontal beam 28 of frame 12, that drives an output shaft 122. The output shaft 122 extends transversely from the gearbox 120 across the front left portion of the machine 10 and projects through the left sidewall 16 of frame 12. A bearing 124, secured to the left sidewall 16, supports the output shaft 122 for rotation. Mounted on the left end of the output shaft 122 is a pickup drive pulley 126, an upper apron drive pulley 128 and a lower apron chain drive sprocket 130.

The drive for the pickup 30 is conventional and includes a belt 132 that extends around the pickup drive pulley 126 and a driven pulley 134 and under a belt tensioning pulley 136. The driven pulley 134 is fixed on a sleeve 138 that rotates about and telescopes over an outwardly projecting stub shaft 140 secured to the left sidewall 16 of frame 12. Inwardly from driven pulley 134 and mounted on the sleeve 138 for rotation therewith about shaft 140 is a chain sprocket 142 connected by chain 144 to a sprocket 145 mounted on the left outboard end of shaft 32 of pickup unit 30. The belt tensioning pulley 136 is supported by an arm 146 that is pivotally connected at 147 to the left sidewall 16 and is biased against the belt 132 by a spring 148 that interconnects the arm 146 to a brace 150 on the upright frame member 62 of frame 12.

The drive for the upper apron 40 is also conventional and includes a belt 152 that extends around the upper apron drive pulley 128 and a driven pulley 154 and under belt tensioning pulley 156. The driven pulley 154 is supported on the left outboard end of the upper apron shaft 54 that supports the upper apron drive sprockets 52. The belt tensioning pulley 156 is supported on one end of an arm 158 whose other end is pivotally supported by pin 160 on upright frame member 62 of frame 12. A spring 162 interconnected between the midportion of arm 158 and brace 150 forces the tensioning pulley 156 against belt 152 for the drivingly relationship of drive and driven pulleys 138 and 154 respectively.

The drive for the lower apron 36, which is part of the present invention, includes a chain 164 entrained around the lower apron drive sprocket 130 and the driven sprocket 116 on the lower apron drive shaft 106. The chain 164 also extends under an adjustable sprocket 166 and over a idler sprocket 168. Thus, it can be seen, that upon rotation of the output shaft 122 and the lower apron drive sprocket 130 therewith in a clockwise direction, as viewed in FIG. 1, the drive sprocket 116, the drive shaft 106 and the drive sprockets 104, that support the rearward end portions of chains 72, are also rotated in a corresponding clockwise direction, resulting in a rearward movement of the working portions of the lower apron chains 72.

The aforementioned mounting and drive for the lower apron 40 decreases the length of the endless chains 72 that are under tension and thus prolongs the useful life of the chains as well as the operational components associated therewith. In such rear end drive arrangement the non-working portions of the chains 72 are less taut than the working portions of the chains 72. Furthermore, such rear end drive arrangement is characterized in a positive pulling action of the chains 72 over the front idler sprockets 78 and rear drive sprockets 104 rather than a pushing action on the chains as in the case of the arrangements of the prior art devices.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

Having thus described the invention, what is claimed:

1. In a machine for forming a roll of crop material, the combination comprising:

(a) a mobile frame adapted to travel across a field;

(b) upper means supported by and extending between the opposite sidewalls of an upper portion of said frame;

(c) lower means mounted on a lower portion of said frame below said upper means to define a roll forming region therebetween, said lower means including a series of fore-and-aft extending transversely spaced apart endless flexible members;

(d) a first series of transversely spaced apart elements rotatably and moveably mounted on the forward end of the lower portion of said frame for moveably supporting said flexible members at respective forward end portions thereof;

(e) a second series of elements transversely spaced along a transverse shaft that is rotatably mounted on the rear end of the lower portion of said frame, said second series of said elements movably support said flexible members at respective rear end portions thereof;

(f) drive means on said frame operably connected to said upper means and directly connected to said transverse shaft of said second series of elements, said drive means including an aligned contiguous series of drive pulleys and drive sprockets and a distant lower driven sprocket affixed to one end of said transverse shaft for moving said upper means in a predetermined direction and for rotating said second series of elements and said flexible members in a direction counter to said predetermined direction of said upper means to thereby coil crop material into a roll at said roll forming region during operation of said machine; and (g) said first series of elements being yieldably movable in a fore-and-aft direction for maintaining a level of tension on said flexible members sufficient to facilitate the coiling of crop material at said roll forming region as said upper means and said flexible members of said lower means are moved in their respective directions by said drive means during operation of said machine.

2. The roll forming machine as described in claim 1, wherein said flexible endless members are flexible chains, said chains being entrained around said respective forward elements and said respective rearward elements.

3. The roll forming machine as described in claim 1, wherein:

said forward elements include a series of transversely spaced apart idler sprockets carried by a respective series of brackets, said brackets support said idler sprockets on said frame for rotational movement thereon and for yieldable movement in a fore-and-aft direction.

4. The roll forming machine as described in claim 3, wherein each of said brackets includes a spring biased arm attached to a respective one of said idler sprockets for supporting said sprocket in a mating relationship with the forward end portion of a respective one of said flexible members.

* * * * *